INFORMATION RECORDING AND LIGHT PROJECTION APPARATUS

Filed July 27, 1964 2 Sheets-Sheet 1

Inventors:
William E. Glenn Jr.,
John L. Henkes Jr.,
by Richard R. Brainard
Their Attorney.

Inventors:
William E. Glenn Jr.,
John L. Henkes Jr.,
by Richard R. Brainard
Their Attorney.

3,377,424

INFORMATION RECORDING AND LIGHT PROJECTION APPARATUS

William E. Glenn, Jr., Scotia, and John L. Henkes, Jr., Loudonville, N.Y., assignors to General Electric Company, a corporation of New York Filed July 27, 1964, Ser. No. 385,302
6 Claims. (Cl. 178—6.6)

ABSTRACT OF THE DISCLOSURE

A combined electron beam recorder and optical projector is disclosed in which the recording is in the form of thickness deformations corresponding to the information and the projector is of the reflection type and utilizes schlieren optics. A single pull-down mechanism is utilized for effecting intermittent motion of the recording medium at both the recording and projection stations and the electron beam is interrupted for the period of scanning of alternate periods corresponding to the scan time of a field so that the pull-down can be accomplished. Light from the projection lamp is also interrupted. In the specific embodiment, both of these interruption means are mechanical and are operated in synchronism with each other and with the recording beam and the pull-down mechanism.

The present invention relates to an improved electron beam recording and light projection apparatus and particularly to apparatus of this type in which the information is recorded in the form of thickness deformations of a recording medium which control the deviation of light impinging thereon to project an image dependent upon the deformations.

In U.S. Patent 3,113,179, granted Dec. 3, 1963, there is described and claimed an apparatus and method for recording information on a thermoplastic medium in the form of light controlling thickness deformations of the medium. The information may be reproduced as a light image by a suitable projection system which projects light selectively in accordance with the deviations caused by the deformations. The present invention relates particularly to a combined recorder and projector which is well suited for projecting an image at a predetermined and usually short interval of time after recording is accomplished. In the preferred embodiment of the invention illustrated it is intended that the image be projected only a single time and accordingly the information is erased by heating immediately following the projection, and this heating is retained sufficiently to maintain the thermoplastic layer of the recording medium in a viscous liquid state during the next recording period so that the tape is heat developed. In a specific form of the invention, the recording medium is in the form of a closed loop of tape which is moved intermittently in a predetermined path including a recording station and a projection station with the time delay between recording and projection being determined by the length of tape in the loop which is interposed between the recording and projection stations respectively. Since the heating is accomplished immediately following the projection, the temperature at the time of recording is controlled, among other things, by the length of tape between the projection and recording stations, respectively. The temperature to which the tape is heated and the tape strucure iself also are factors affecting the temperature of the recording layer at the time it reaches the recording station.

It is apparent from the foregoing that the present invention is particularly suited to certain types of instructional or educational applications. For example, the recording may take place during a period of action by a performer, such as a bowler or golfer, and the projection may take place as soon as the bowling or golf swing is complete so that the performer may witness a visual demonstration of what actually took place. This visual reproduction of the performance permits coaching or self-instruction. It is apparent that acting or other performances may be reviewed in this manner. The slightly delayed projection of action may also be used as a novelty or amusement device.

It is accordingly an important object of the present invention to provide improved combined recording and light projection apparatus.

Further objects and advantages of the present invention will become apparent as the following description proceeds, reference being had to the accompanying drawings, and its scope will be pointed out in the appended claims. In the drawing:

Figures 4, 5:
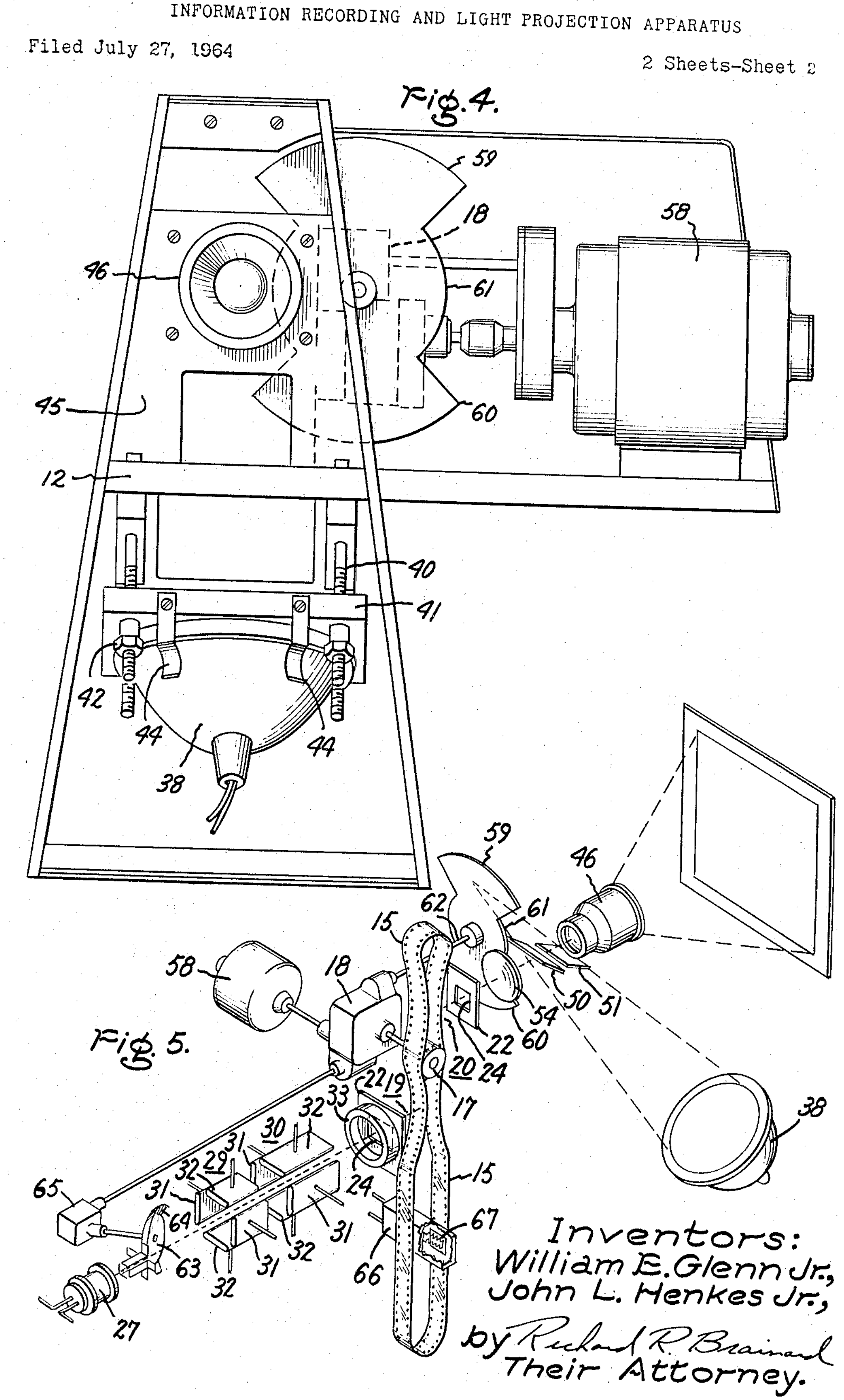
FIG. 4 is an end elevational view of the combined recorder and projector of FIG. 1.
FIG. 5 is an isometric view showing the functional relationship between the electron beam recording and optical projection components of the combined recorder and projector of FIG. 1.

Referring now to the drawing, the present invention is illustrated as embodied in a combined electron beam recording and optical projection system including a vacuum-tight housing 10 including a port 11 for connection with a vacuum system and supported from a horizontal plate 12 which may, for example, be a shelf in a supporting and enclosing cabinet (not shown). The recording medium, which in the specific embodiment illustrated is in the form of a closed loop of multilayer tape 15, is supported for intermittent advancing motion in a generally vertically extending portion 14 of the vacuum chamber 10, and the tape extends downwardly into an elongated extension of the chamber provided by a glass tube 16 removably joined in vacuum-tight relation to the housing 10 and terminating in an enlarged portion **16*a* at its lower end. The tape is driven by a sprocket wheel 17 of an intermittent motion and speed reduction assembly illustrated at 18 in FIGS. 4 and 5. The tape is advanced past a writing or recording station 19 and a projection station 20 each of which includes a stationary guide member 21 and a movable gate member 22. The gate member is operable by cam action to move toward and away from the stationary member 21 under the control of an operating handle 22*a*. This construction and its operation are very similar to that employed in a conventional home movie projector. The cooperating faces of the members 21 and 22 are relieved so as to guide the tape only at its edges. Supported from and coupled to each of the movable members 22 is another film engaging member 23 which serves to positively urge the tape toward the sprocket 17 of the intermittent mechanism 18. As shown in FIG. 5, the movable gate member 22 at each of the stations 19 and 20 defines a rectangular aperture 24 which outlines the writing area and the projection area at the recording and projection stations 19 and 20** respectively.

Housed within the neck portion 26 of the vacuum chamber 10 is an electron gun assembly 27 for producing and accelerating a beam of electrons toward the electron beam recording station 19. Interposed between the gun 27 and the recording area is a beam deflection and focusing structure 28 including two sets of axially spaced electrodes 29 and 30 with each set including two pairs of electrodes 31 and 32 conveniently termed horizontal and vertical deflection electrodes. In addition to beam deflection these electrodes, in cooperation with cylindrical electrode 33, which may be conveniently mounted on the gate member 22 of the recording station 19 form a 3-element or Einzel lens. The particular electron gun and electron focusing and deflection electrode system disclosed in the present application as the means for establishing an electron charge pattern on the tape is not by itself a part of the present invention and may to advantage be of the type described and claimed in co-pending Glenn application Serial No. 335,117, filed January 2, 1964, and assigned to the assignee of this invention. Said application was abandoned in favor of a continuation-in-part application Ser. No. 471,993, filed July 14, 1964, now Patent No. 3,320,468, granted May 16, 1967. It is sufficient that the focused beam of electrons impinges on and is scanned over the area of the tape lying within the aperture 25 of the gate at the recording station 19 and that it be intelligence modulated in accordance with the information to be recorded to deposit a charge pattern which varies in density point-by-point in accordance with that information. For recording black and white television pictures, for example, the vertical sweep voltage is modulated by superimposing on the vertical deflection voltage a voltage of about 50 megacycles which is amplitude modulated in accordance with the intensity of the black and white picture. The black and white signal is an inverted signal, i.e., maximum amplitude corresponds to black. For recording of color information the beam may be velocity modulated in both horizontal and vertical directions in accordance with different color components, as described and claimed in Glenn Patent No. 3,118,969, granted Jan. 21, 1964.

Figures 1, 2, 3:
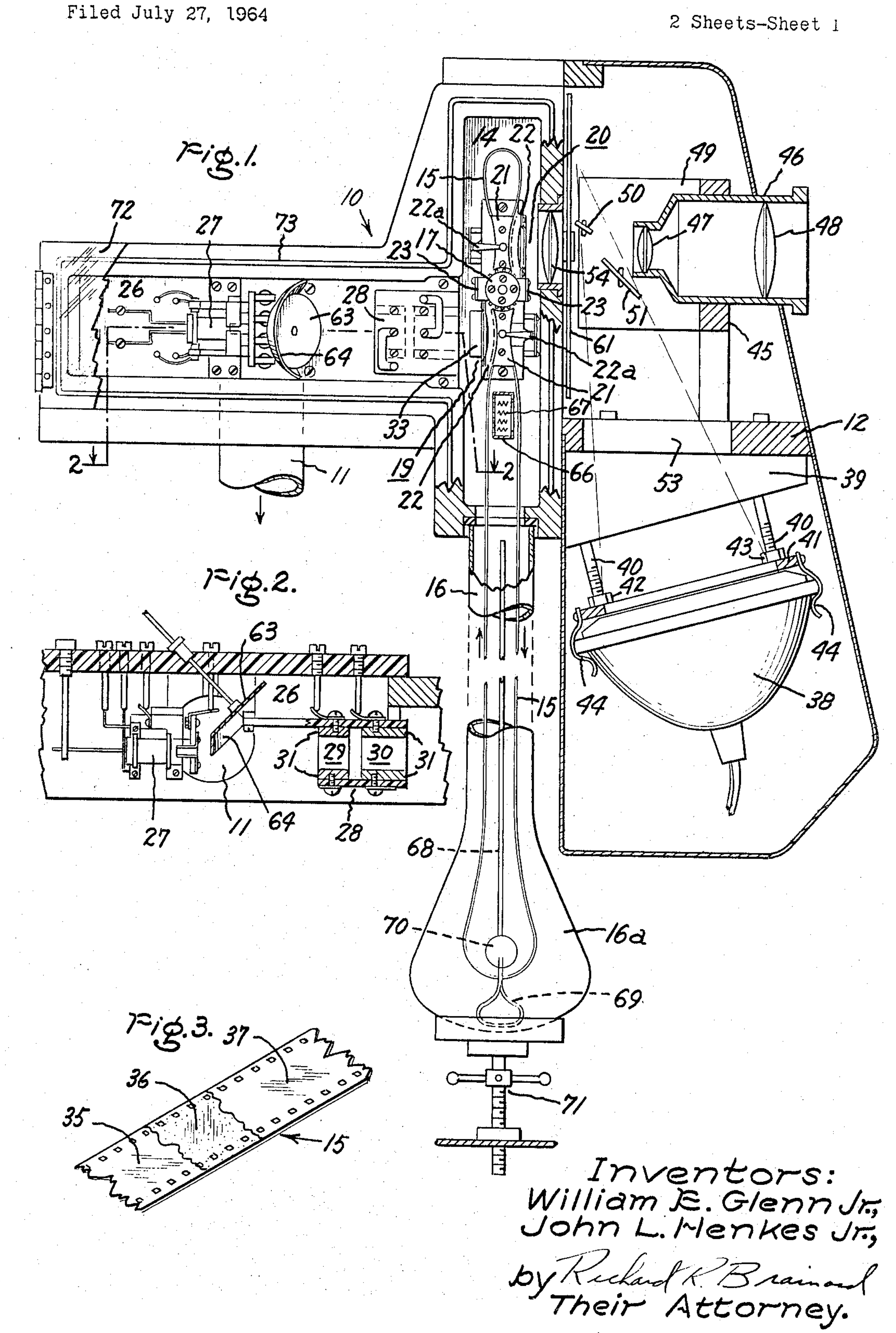
FIG. 1 is an elevational view, partially in section, of a combined electron beam recorder and light projection system embodying the present invention.
FIG. 2 is a sectional view of a portion of the electron gun structure taken along the line 2—2 of FIG. 1.
FIG. 3 is an isometric view of a multilayer recording tape useful in the present invention.

A recording medium suitable for use in the present recorder and projector is shown in FIG. 3 as a tape 15 comprising a metal backing layer 35 which may be of thin stock in the order of 1 mil thick and of a material such as stainless steel or Phosphor bronze. Overlying this backing strip is a lacquer such as a solventless varnish and over this is a reflecting or mirror layer 36 of aluminum, silver or the like having a thickness of about 300 A. to 1,000 A. This layer may be vapor deposited in a vacuum. The actual recording layer 37 is a thin layer of thermoplastic material which may be applied by well known coating methods to the mirror layer 36 such as by roll casting or meniscus coating. The thermoplastic layer may comprise a solution containing approximately 27 percent by weight polydiphenylsiloxane, 3 percent polyphenylene oxide, 50 percent benzene and 20 percent toluene. Examples of other thermoplastic materials suitable for the recording layer of tapes of the type here described are disclosed and claimed in U.S. Patent 3,063,872—Boldebuck, granted Nov. 13, 1962.

A suitable tape for use in the present invention and methods of making the tape are described in detail and claimed in copending Herrick application Ser. No. 312,947, filed Oct. 1, 1963, and assigned to the assignee of the present invention. As described and claimed in the Herrick application, the smoothness of the reflecting layer may be enhanced by applying a layer of solventless varnish over the metal backing layer 35 in order to smooth the imperfections of the metal backing layer and provide an adhesive to which the vapor deposited mirror surface readily adheres.

As will be readily appreciated, by those skilled in the art, the intelligence modulated electron beam when scanned over the recording area establishes an electric charge pattern varying in density point-by-point over the raster area with the information to be recorded and which, when the thermoplastic layer is at an elevated temperature sufficient to render it a viscous liquid, is effective to produce an electrostatic force which establishes a corresponding pattern of thickness deformation. As described in more detail in the above-mentioned Glenn Patent 3,113,179 and in Glenn Patent 3,078,338, such a pattern of deformations is effective when utilized with a suitable light source and light masking system to project an optical image corresponding to the thickness deformations and the stored information.

In accordance with the illustrated embodiment of the present invention, a compact optical projection system of the reflection type is provided and is utilized in cooperation with the deformed tape at the projection station 20 This system is simple, compact and particularly suited to projecting black and white pictures. As illustrated, a projection lamp 38 is supported from the lower side of the shelf 12 by a pair of brackets 39 and four mounting studs 40 secured thereto. An apertured mounting plate 41 is secured to the studs 40 between nuts 42 and 43. The plate 41 is apertured and shaped to provide a seat against which the lamp is held by suitable spring clips 44 secured to the edge of the mounting plate 41. An upright supporting bracket 45 extends upwardly from the shelf 12 and supports a projection lens assembly 46 including lenses 47 and 48. Side plates 49 carried by the bracket 45 provide side supports for mirrors 50 and 51 which are adjustably mounted as to both angle of inclination and spacing. Shelf 12 is apertured as shown at 53 to permit a cone of light provided by the projection lamp 38 to impinge upon the mirrors 50 and 51, which are each adjusted in position to image the light from one-half of the cone of light provided by the projection lamp 38 on the raster area at the projection station 20 as outlined by the aperture 24 in the movable member at the gate 22 through a lens 54 which provides a part of the wall of vacuum housing 10 and images the light of the mirrors 50 and 51 on the raster area of the tape 15. The stationary portion of the gate is curved so that in cooperation with the lens 54 light impinging on the raster area when the surface of the tape is undeformed by recorded information is reflected by the mirror surface 36 of the tape with the light originally reflected by mirror 50 intercepted by mirror 51 and the light originally reflected by mirror 51 intercepted by the mirror 50. As will be explained in more detail in a later point in the specification, when the surface of the tape is deformed in accordance with the recorded information the light is diffracted and passes through the slot between the adjacent edges of the mirrors 50 and 51, and this slot is imaged on the image area of the screen as shown in FIG. 5, for example, by the projection lens assembly 46. The intensity of the light passed is dependent upon the depth of the light controlling deformations in the surface layer of the tape which is in turn dependent upon the charge density of the electron charge deposited by the modulated electron beam.

In the modification of the invention just described the tape is stationary during the writing and projection operation and is advanced by an amount of the height of one raster every 1/15 of a second by the intermittent or pull-down mechanism 18. This is accomplished by synchronous motor 58 which is energized from 60-cycle alternating current and may rotate at a speed of 1800 r.p.m. The intermittent mechanism operates every two revolutions of the motor shaft, which is every 1/15 of a second. This operation takes place during a very small portion of the time required for a revolution of the motor, and in order to avoid undesirable flicker of the image, the optical path is interrupted at a somewhat higher frequency by disc-like segments 59 and 60 of an optical shield or chopper 61. In the embodiment illustrated, each segment has an angular extent of approximately 90 degrees and is rotated by a shaft 62 which makes two revolutions for each operation of the intermittent mechanism. In other words, the light to the screen is interrupted four times every 1/15 of a second for an interval of about 1/120 of a second for a segment 59 having a 90-degree angular extent.

The electron beam writing and vertical sweep intervals are also synchronized with the pulldown and blanking or chopping of the light image. The video information is supplied at a 30 cycle rate, i.e., the information contained in a raster area is supplied over an interval of $\frac{1}{30}$ of a second and the vertical sweep voltage repeats at $\frac{1}{30}$ of a second rate. However, every other raster is not written since the tape is advanced only at a repetition rate of every $\frac{1}{15}$ of a second. This omission of the electron beam writing is accomplished in accordance with the present invention by a mechanical electron beam interruptor 63 driven at the same speed as the light interruptor and having a beam interrupting segment 64 of approximately 180 degrees. In actual practice it is desirable to have the interruption slightly longer than 180 degrees and in the illustrated embodiment it is about 198 degrees, leaving 162 degrees for the writing interval. The beam interruptor 63 is rotated by mechanism 18 and means including a V drive unit 65 at a speed of one revolution every $\frac{1}{15}$ of a second. Thus writing takes place substantially half of the total time and the projection takes place over the entire time but is interrupted four times each $\frac{1}{15}$ of a second or at a 60-cycle rate for a total time of about $\frac{1}{30}$ of a second. Neither writing nor projection takes place during the pull down interval.

After a picture has been projected at station 20, the tape advances in a downward direction, as shown in FIG. 1, and passes adjacent an electric heater unit 66 including resistance element 67 which may be formed as a plug-in unit which plugs into mutually insulated terminals (not shown) sealed into the back wall of the vacuum chamber 14. A separate path for the descending and ascending portions of the tape loop is insured by a mechanical separator in the form of an elongated metal plate 68 having a lateral transverse dimension slightly smaller than the inner diameter of the glass tube and having wire-like extensions 69 which rest on the bottom of the glass tube. Supported between these wire extensions is a fixed guide spool 70. The tube is supported by an adjustable support 71 which urges it against a sealing gasket (not shown) inserted between the upper end of the tube 16 and a circular shoulder formed in the lower end of the vacuum casing 14. The front of the vacuum housing 10 is rendered accessible by a hinged door 72 which may be formed of an insulating plate such as Plexiglas and which is sealed by means of an O-ring type of gasket shown at 73 embedded in the face of the side wall of the vacuum chamber.

As mentioned earlier in the specification, the electron beam forming, accelerating, deflection and focusing electrodes may be functionally of the type described and claimed in Glenn copending application Serial No. 335,-117, and may be energized in the manner there described. Accordingly, a circuit for energizing these electrodes is not shown in the drawing of the present application. Brief comment about the functioning of these electrodes is included here as helpful to a better understanding of the operation of the invention. Referring particularly to FIG. 5, the electron beam is formed and accelerated by the gun structure designated generally by the numeral 27 and directed along the beam axis toward the beam writing raster area at the recording station 19. The beam passes between the horizontal and vertical deflection plates 31 and 32 of both sets 29 and 30 and through the circular lens element 33. The cathode of the gun structure is operated at a high negative voltage equal to the beam accelerating voltage, the deflection electrodes 29 and the electrode 33 are maintained at direct current ground potential while the electrodes of set 30 forming the intermediate focusing electrode of the lens system, is maintained at a high negative voltage, for example, about $\frac{3}{4}$ the beam accelerating voltage. The horizontal sweep voltage is applied to the horizontal defection electrodes 31 of both sets 29 and 30 and the vertical sweep voltage is impressed on both sets of vertical deflection electrodes 32 in accordance with the teachings of the aforesaid Glenn patents and application. Since the simplified reflection type projection system described and illustrated in the present application is particularly suited for projecting black and white pictures, it will be assumed that the video signal is a black and white signal. This signal, in the form of an alternating signal of about 50 megacycles, amplitude modulated in accordance with the video information, is impressed on the vertical deflection electrodes to wobble the beam in a vertical direction at the 50-megacycle rate and by an amount inversely proportional to the intensity of the light point-by-point, i.e., the black and white signal is an inverted signal. As will be readily understood, this distributes the charge over a wider or narrower line as it sweeps across the raster area with resulting decrease and increase in the charge density and, since the amplitude of this increase and decrease is determined by the intensity of the black and white signal, the variation in the charge density is dependent upon this intensity. The resultant deformations of the film have a depth determined by the amplitude of the modulating signal (inversely related) which in turn depends upon the light intensity.

While in the illustrated embodiment of the invention a relatively small loop has been shown, corresponding to a one second delay between writing a picture at station 19 with the modulated electron beam and projecting a picture at station 20, it will be appreciated that the delay may be increased simply by providing tape storage between the writing and projection stations, preferably within the vacuum housing. This may be accomplished to advantage by a circuitous path of guiding pulleys for the tape.

It is apparent from the foregoing description that the present invention provides a simple combined recorder and projector in which both operations take place while the tape is stationary. In the particular embodiment illustrated a single pull down mechanism is used with a closed loop of tape with a single heating means for erasing and developing. Also, mechanical interrupting means for both the projected light beam and the writing electron beam are coupled to the drive for the intermittent or pull down mechanism so that writing and projection are both interrupted during pull down and the light path is additionally interrupted to increase the interruption rate to the point where the picture does not appear to flicker.

While a simplified reflection optical system is shown and is particularly suitable for black and white pictures, it will be apparent that the invention in its broader aspect is not limited to such a system and transmission optics and a color writing and projection system may be provided if desired.

While we have shown and described a particular embodiment of our invention it will be apparent to those skilled in the art that many changes and modifications may be made without departing from our invention's broader aspects and we aim therefore in dependent claims to cover all such changes and modifications which fall within the true spirit and scope of our invention.

What we claim as new and desire to secure by Letters Patent of the United States is:

1. A combined recorder and projector comprising a tape transport mechanism including means for moving a tape along a predetermined path with intermittent advancing motion, means for establishing an electron beam and scanning it over an area of said tape at one location along the path of movement of said tape during alternate intervals of substantially equal length so that periods of recording when the tape is stationary are separated by a substantially equal period during which there is no recording, and during which the tape is moved, means for modulating said beam in accordance with information to be recorded, an optical system including a source of light and a light masking means for projecting an image corresponding to the recorded information at a second location along the path of movement of said tape, the length of tape between said first and second locations determining the time interval between the writing on and projection from the same tape area.

2. A combined recorder and projector comprising tape transport means including a single intermittent motion mechanism for moving a tape along a predetermined path with intermittent advancing motion, means for establishing an electron beam and scanning it over an area of said tape at one location along the path of movement of said tape during alternate intervals of substantially equal length so that periods of recording when the tape is stationary are separated by substantially equal periods during which there is no recording, and during which the tape is moved, means for modulating said beam in accordance with information to be recorded, an optical system including a source of light and a light masking means for projecting an image corresponding to the recorded information at a second location along the path of movement of said tape, the length of tape between said first and second locations determining the time interval between the writing on and projection from the same tape area.

3. Apparatus for electron beam recording and optical projection of recorded information comprising an evacuated chamber, means for guiding and intermittently advancing a closed loop of recording tape over a predetermined path within said chamber, means for impinging an information modulated electron beam on said tape and scanning it over a predetermined area at one station between advances of said tape, means illuminating said tape at another station and projecting light controlled by the information recorded on said tape to an image area, and heating means positioned along the return path of the tape from the second of said stations to the first of said stations for heating said film to erase the recorded information, the length of tape between said two stations being correlated with the location of said heating means, the erasure temperature and the parameters of the tape so that the recording layer is heat-developed after impingement of said electron beam on the tape at the first of said stations without the application of additional heat.

4. A combined recorder and projector comprising a tape transport mechanism including means for moving a tape along a predetermined path in intermittent advancing motion, means for establishing an electron beam and scanning it over an area of said tape during a time interval of predetermined length at one location along the path of movement of said tape, means for modulating said beam in accordance with information to be recorded, an optical system including a source of light and light masking means for projecting an image corresponding to the recorded information at a second location along the path of movement of said tape, and means synchronized with the operation of said tape transport mechanism for interrupting both said electron beam and the projected light during advancing motion of said tape said means for interrupting said electron beam being effective for alternate periods of time each essentially equal in length to said predetermined length.

5. An electron beam recorder comprising a tape transport mechanism including means for moving a tape along a predetermined path in intermittent advancing motion, means for establishing an electron beam and scanning it over an area of said tape at one location along the path of movement of said tape while said tape is stationary, means for modulating said beam in accordance with information to be recorded, and mechanical means synchronized with the operation of said tape transport mechanism for interrupting said electron beam during advancing motion of said tape.

6. A combined recorder and projector comprising a tape transport mechanism including means for moving a tape along a predetermined path in intermittent advancing motion, means for establishing an electron beam and scanning it over an area of said tape at one location along the path of movement of said tape while said tape is stationary, means for modulating said beam in accordance with information to be recorded, an optical system including a source of light and light masking means for projecting an image corresponding to the recorded information at a second location along the path of movement of said tape, and means synchronized with the operation of said tape transport mechanism for interrupting both said electron beam and the projected light during advancing motion of said tape, said last mentioned means including a mechanical barrier movable to beam interrupting position in synchronism with the operation of said tape transport mechanism.

References Cited

UNITED STATES PATENTS 3,239,602 3/1966 Lemelson ---------- 178—6.6

ROBERT L. GRIFFIN, *Primary Examiner.*

JOHN W. CALDWELL, *Examiner.*

H. W. BRITTON, *Assistant Examiner.*